United States Patent [19]

Yamauchi et al.

[11] 4,128,503

[45] Dec. 5, 1978

[54] CATALYST FOR PURIFYING EXHAUST AND WASTE GASES AND METHOD FOR PREPARATION THEREOF

[75] Inventors: Shin Yamauchi, Ikeda; Kiyoshi Yonehara, Takatsuki; Koshi Horie, Suita; Tetsuji Ono, Amagasaki; Takashi Ohara, Nishinomiya, all of Japan

[73] Assignee: Nippon Shokubai Kagaku Kogyo Co. Ltd., Osaka, Japan

[21] Appl. No.: 782,759

[22] Filed: Mar. 30, 1977

[30] Foreign Application Priority Data

Mar. 31, 1976 [JP] Japan .................................. 51/34342
May 19, 1976 [JP] Japan .................................. 51/56657

[51] Int. Cl.$^2$ .................. B01J 27/14; B01J 31/02; C01B 25/00
[52] U.S. Cl. .............................. 252/435; 252/437; 252/428; 423/213.5

[58] Field of Search ................ 252/435, 437, 428; 423/213.5

[56] References Cited

U.S. PATENT DOCUMENTS

| | | | |
|---|---|---|---|
| 3,224,831 | 12/1965 | Stephens | 423/213.5 |
| 3,360,330 | 12/1967 | Hoekstra | 423/213.5 |
| 3,388,077 | 6/1968 | Hoekstra | 423/213.5 X |
| 3,409,390 | 11/1968 | Hoekstra | 423/213.5 |

Primary Examiner—George Crasanakis
Assistant Examiner—William G. Wright
Attorney, Agent, or Firm—Omri M. Behr

[57] ABSTRACT

The present invention relates to a catalyst for purifying exhaust and waste gases which is capable of simultaneously removing nitrogen oxide, carbon monoxide and hydrocarbons from the exhaust gases, comprising supporting phosphorus, barium, rhodium and at least one member selected from the group consisting of palladium and platinum, and optionally nickel on a carrier, and a method for preparation thereof.

16 Claims, 1 Drawing Figure

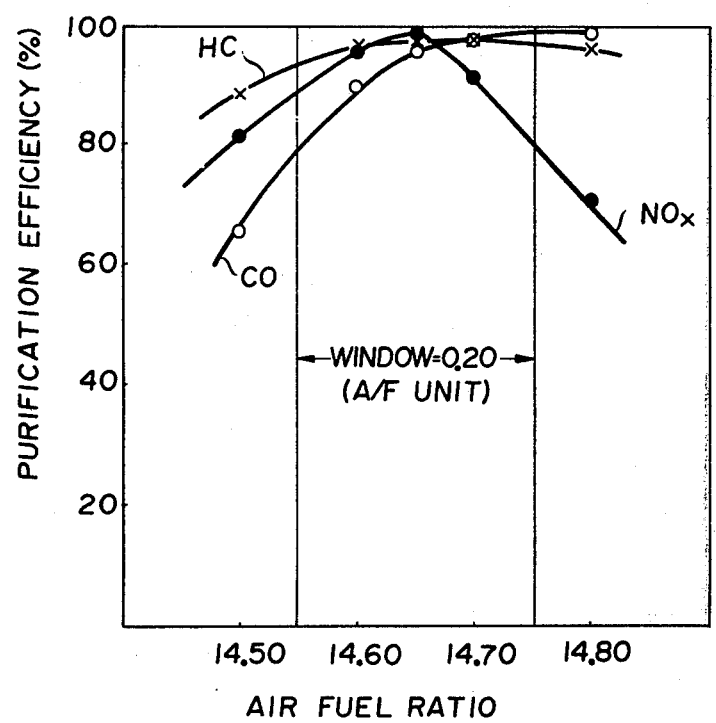

CATALYST FOR PURIFYING EXHAUST AND WASTE GASES AND METHOD FOR PREPARATION THEREOF

This invention relates to a catalyst for purifying exhaust and waste gases and a method for preparation thereof, and particularly, to a catalyst for purifying exhaust and waste gases containing harmful components such as unburned hydrocarbons, carbon monoxide and nitrogen oxides and a method for preparation thereof. More particularly, the present invention relates to a catalyst for purifying the vehicular exhaust gas by converting simultaneously unburned hydrocarbons, carbon monoxide and nitrogen oxides to substantially harmless compounds when internal combustion engines are operated in the vicinity of theoretically stoichiometric air fuel ratio and a method for preparing the catalyst of the type just mentioned.

A number of oxidation catalysts comprising oxidation promoters such as platinum, palladium and other noble metals, dispersed or supported on a carrier matrix have been proposed and some of them are not practically used for reducing quantities of hydrocarbons and carbon monoxide contained in the exhaust gas from internal combustion engines. These oxidation catalysts are used in most of currently available automobiles. While various types of catalysts for reducing the conent of nitrogen oxides in the exhaust gases have been also proposed, all of these catalysts are found to be unsatisfactory in one or more of purification performance, durability and economy.

In order to totally remove these three harmful pollutants from the exhaust gas, there is known a two step catalytic system, i.e. dual bed system wherein a carbureter is set in a fuel rich side so that the exhaust gas is in a reductive atmosphere, under which the exhaust gas is passed over the first reduction catalyst to undergo a reduction reaction of nitrogen oxides, and then carbon monoxide and unburned fuel hydrocarbons are oxidized on the second oxidation catalyst with excess oxygen from air pump. However, this system is disadvantageous in that ammonia formation in the reduction reaction of nitrogen oxides cannot be suppressed completely, so that the ammonia once formed is again oxidized to the nitrogen oxides over the second oxidation catalyst, consequently lowering the overall reduction efficiency.

In recent years, electronic fuel injection devices and oxygen sensors of high performance have been progressively developed, by which it becomes possible to maintain an air fuel ratio very close to stoichiometric air fuel ratio. As a consequence, intense interest has been lately shown towards an one step purification method, i.e. a simultaneous purification method using one catalyst having both oxidizing and reducing abilities, in which carbon monoxide, hydrocarbons and nitrogen oxides are simultaneously removable by ternary reaction, i.e. 3-way reaction.

With the aid of electronic fuel injection devices and oxygen sensors, internal combustion engines are operable responding to various operating conditions by means of feed-back control, i.e., closed loop system. It has been reported that an internal combustion engine can be operated under such control within ± 0.15 air fuel ratio from the stoichiometric point. It has been also reported that the operation of an internal combustion engine in the vicinity of a stoichiometric air fuel ratio has a prominent advantage that the fuel charge is improved over the case of prior art and sulfur contained in the fuel is hardly converted to $SO_3$ mist due to low content of oxygen (see Publication of Society of Automotive Engineering (SAE) 750096).

There are known several kinds of catalysts for the 3-way reaction including, for example, a catalyst comprising a noble metal such as platinum, palladium, rhodium, iridium, ruthenium or the like supported on a carrier and a catalyst using a heavy metal compound of the perovskite crystal structure. However, all of these catalysts have some of the following disadvantages: the catalytic activity is insufficient in low temperature ranges; a certain kind of the noble metals such as ruthenium have a tendency of being converted to toxic volatile gas when exposed in an oxidative atmosphere; some catalysts may react in too narrow variation range of exhaust gas compositions treatable with the catalysts to efficiently and simultaneously remove the three air pollutants, i.e., nitrogen oxides, carbon monoxide and hydrocarbons, i.e. in a narrow width of a tolerable air fuel ratio (hereinafter referred to as 3-way reaction window width); some catalysts are unsatisfactory in catalytic activity unless a specific element such as rhodium which is severely limited in quantity of production thereof (e.g., the production of rhodium is only in an amount of 1/15–1/20 times as small as that of platinum) is employed in relatively large amount; and most catalysts are unrealistic in economy due to use of large amount of expensive noble metals. Needless to say, the catalysts for the 3-way reaction are essential, similarly to oxidation catalysts, to have high thermal stability, durability, and poison resistance.

Accordingly, it is an object of the present invention to provide a novel catalyst for purifying exhaust and waste gases and a method for preparation thereof.

It is another object of the present invention to provide a catalyst for the purifying exhaust and waste gases whereby carbon monoxide, unburned hydrocarbons and nitrogen oxides are removable at the same time in an efficient manner and a method for preparation thereof.

It is a further object of the present invention to provide an economical catalyst which is of very high in purification performance of nitrogen oxides removal even when employed under relatively low temperature conditions and is of wide 3-way reaction window width and excellent thermal stability, durability and poison resistance, and a method for preparation thereof.

Hereinbelow the term "calculated as atom" indicates the weight of the elemental portion of the designated substance whether it exists in elemental or combined form. Thus, for example, "2–50 g of phosphorus" indicates the weight of phosphorus in the phosphorus oxide portion of the catalyst.

The above objects can be achieved by a catalyst according to the invention which comprises 2–50 g of phosphorus, 2–50 g of barium, 0–30 g of nickel, 0.05–3 g of at least one member selected from the group consisting of palladium and platinum, and 0.005–0.3 g of rhodium, each calculated as atom supported on an inert carrier per liter of a final catalyst.

The catalyst can be readily prepared by depositing catalytic components of 2–50 g of phosphorus, 2–50 g of barium and 0–30 g of nickel on an inert carrier matrix, calcining the thus deposited carrier matrix at a temperature of 400°–1050° C., further depositing catalytic components of 0.05–3 g of at least one metal selected from the group consisting of palladium and platinum and 0.05–0.3 g of rhodium, and drying and then subjecting the deposited carrier to oxidation or reduction for activation. The amounts of the respective catalytic components are calculated as atom per liter of a final catalyst — palladium, platinum and rhodium are thought to exist in the metallic state in the final catalyst. Phosphrus, barium and nickel are thought to be in the form of catalytic oxide in a final catalyst. Such catalytic oxide may exist in the form of oxides such as barium oxide, nickel oxide, phosphorus oxide, and the like, in the form of salts of barium, nickel, or phosphorus or of oxides in a partially reduced state of oxidation such as $NiO_x$ wherein x is a figure greater than 0 and less than 1.

The particular mechanism of the catalyst or the chemical behaviors of the respective catalytic components are not clearly known, however, it has been found that, in addition to the fundamental catalytic activity of either or both of palladium and platinum, phosphorus component serves to considerably suppress formation of ammonia thereby improving a real purification rate for nitrogen oxides, and barium component acts to accelerate oxidation of carbon monoxide and hydrocarbons under conditions of low oxygen concentration. It is also found that a small amount of rhodium expedites the reduction reaction of nitrogen oxides. As a result, the catalyst can considerably widen the 3-way reaction window width. The presence of nickel results in improvement of the purification performance for nitrogen oxides in high temperature range. In addition, the final catalyst is found to have excellent thermal stability, durability and poison resistance. These advantages are considered to result from a synergestic effect of the respective catalytic components. Presumably, the degree of synergestic effect will depend on the inherent properties and the state of dispersion of the employed noble metals per se as well as the factors or properties of the entirety of the catalyst such as acidity, basicity, etc.

The present invention will be readily understood from the following description.

A sole FIGURE is a graph showing an example of definition of 3-way reaction window width in air fuel ratio (A/F unit).

In the practice of the invention, the quantities, calculated as atom per liter of a final catalyst, of the catalytic components are 2–50 g, preferably 2–30 g of phosphorus, 2–50 g, preferably 2–30 g of barium, 0–30 g, preferably 0–20 g of nickel, 0.05–3 g, preferably 0.1–2 g of at least one metal selected from the group consisting of palladium and platinum, and 0.005–0.3 g, preferably 0.01–0.2 g of rhodium. It is sufficient that rhodium which is expensive is used in an amount of below 1/2 time, preferably below 1/5 time and most preferably below 1/10 time that of the at least one metal selected from palladium and platinum.

Though any kinds of carriers which are inert to the reactions, refractory and porous may be used for the purpose of the present invention, carriers primarily composed of so-called active alumina with a surface area of 30–300 m$^2$/g are preferred. Apart from alumina, silica-alumina, silica, magnesia, zirconia, titania, etc., which are stable to heat and have physical strengths sufficient to be employed as carrier are also preferably used. The carrier is generally used in the form of spheres, cylindricals or granules which have an average diameter or major length of 1.5–15 mm, preferably 2–8 mm. As a matter of course, commercially available carriers such as "Aeroban" carrier produced by American Cyanamid Co., SCS 79 produced by Rhone-Progil, etc., are suitably employable. In addition to the above-mentioned carriers, an alumina carrier which has been previously added or incorporated with phosphorus or barium and molded may be also used. Further, there are known so-called monolithic substrates of a honeycomb, corrugated or rectangularly perforated form made of alumina, mullite, cordierite, silicon carbide, magnesium silicate, etc. These monolithic substrates which have been coated with refractory powders primarily composed of alumina having a surface area 50–300 m$^2$/g may be likewise used.

In practice, the catalytic components are applied onto the carrier in the form of an inorganic salt, an organic salt, a metal-containing acid or its salt which can easily form an aqueous solution thereof. For example, typical starting phosphorus sources or compounds are phosphorus pentoxide, phosphoric acid, ammonium phosphates such as mono-, di- and tri basic, and the like. Typical of the starting barium sources or compounds are barium oxide, barium hydroxide, barium nitrate, barium chloride, barium chlorate, barium acetate and the like. Nickel nitrate, nickel chloride, nickel sulfate, nickel acetate and the like are typically usable as nickel sources. Of the barium and nickel sources, the nitrate and acetate are preferable. In addition, phosphric acid compounds of barium or nickel may be likewise used.

Preferred sources of palladium, platinum and rhodium are chlorides, nitrates, chlorometallic acids, acetates and other water soluble complexes including, for example, palladium acetate, palladium dichloride, palladium nitrate, tetraammine palladium (II) chloride, platinum trichloride, platinum tetrachloride, hexachloro platinic (IV) acid, ammonium hexachloroplatinate (IV), dinitro diammine platinum (II), rhodium trichloride, ammonium hexachlororhodate (III), rhodium nitrate and the like.

The preparation of the catalyst according to the invention using the carrier and the starting catalytic components will be described. First, phosphorus, barium and, if required, nickel are deposited on a carrier by adding an aqueous solution of a mixture of predetermined amounts of water-soluble salts or inorganic acids of phosphorus, barium and nickel to the carrier and concentrating the solution to permit the catalytic components to be impregnated into the carrier. Alternatively, the catalytic components may be deposited on the carrier by immersing the carrier in an aqueous solution of the respective components in predetermined ratios, withdrawing the thus immersed carrier from the solution, and drying it. These components are not necessarily required to be deposited at the same time. For example, the deposition is feasible by a two-step treatment wherein phosphorus and barium components are first subjected to deposition on carrier the deposited carrier is dried and calcined and then nickel component is treated in a similar manner, or by a three-step treatment wherein phosphorus, barium and nickel components are separately applied to treat a carrier therewith. The carrier merely deposited or applied with these catalytic components must be dried at 80°–150° C. and then calcined in an oxidative atmosphere at 400°–1,050° C., preferably 550°–950° C., for 0.5–8 hours, preferably 1–5 hours.

The noble metal components are subsequently deposited on the thus calcined carrier. The deposition may be conducted by dissolving water-soluble compounds of palladium and/or platinum and rhodium in water, and impregnating the carrier with the aqueous solution. Preferably, the carrier is first impregnated with an aqueous solution of rhodium alone and dried at a temperature of 80°–150° C., and then impregnated with an aqueous solution of a water-soluble platinum and/or palladium compound. (two step impregnation method).

The carrier deposited or supported with all of the catalytic components is dried at a temperature 80°–150° C. and activated by oxidation or reduction. The activation is feasible, for example, by calcining the deposited carrier in an oxidative atmosphere such as of air at a temperature of 150°–600° C., preferably 300°–600° C., for 0.5–5 hours, preferably 1–3 hours (oxidation calcination). Alternatively, the deposited carrier may be activated by calcining it in a reductive atmosphere such as of a nitrogen stream containing hydrogen, formaldehyde or hydrazine at a temperature of 150°–600° C., preferably 300°–600° C., for 0.5–10 hours, preferably 1–5 hours (reduction calcination), or by treating it with hydrazine or formaldehyde at a temperature of 10°–50° C.

Upon the deposition of the respective catalytic components of phosphorus, barium, nickel and the noble metals by the impregnation or immersion technique, it has been found very useful to employ poly(oxyethylene) type nonionic surface active agents. The presence of such surface active agent causes a suitable degree of foaming and a smooth contact between the aqueous catalytic components solution, the carrier particles and the walls of a container. With phosphorus, barium and nickel, the deposition can be effected uniformly and reproducibly. While, with the noble metal components, the surface active agent serves to effectively disperse the components on the outer surfaces and outer layer of the carrier due to low penetrating power of the surface active agent, making it possible to reduce the amounts of the noble metal components to a minimum so as to impart to the final catalyst a desired level of catalytic activity. This is especially advantageous from a viewpoint of economy in mass production of the catalyst.

The poly(oxyethylene) type nonionic surface active agent used in the method of the present invention should be of an average molecular weight of at least 500, preferably at least 1,000, because those of an average molecular weight of less than 500 are too penetrative to make it difficult to support a catalytic substance, especially a noble metal component in a high concentration only on the surface of a support. Accordingly, as the nonionic surface active agent suitably used are those having relatively low penetration. The aforesaid nonionic surface active agent is used in an amount usually of 0.05 to 50 g, preferably of 0.1 to 20 g per liter of support. In case where a support is soaked in an aqueous catalytic substance solution, the nonionic surface active agent is used in a concentration usually of 0.005 to 10, preferably of 0.01 to 5% by weight of the solution.

Representatives of the poly(oxyethylene) type nonionic surface active agent are: polyethylene glycols HO(CH$_2$CH$_2$O)$_n$H wherein n = 11–900; poly(oxyethylene) glycol alkyl ethers R—O(CH$_2$CH$_2$O)$_n$H wherein R is alkyl groups containing 6 to 30 carbon atoms and n = 3–120, such as poly(oxyethylene) lauryl ether, poly(oxyethylene) cetyl ether, poly(oxyethylene) stearyl ether and poly(oxyethylene) oleyl ether; poly(oxyethylene) alkylaryl ethers

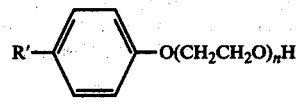

wherein R' is alkyl group containing 6–20 carbon atoms and n = 3–120, such as poly(oxyethylene) octylphenyl ether and poly(oxyethylene) nonylphenyl ether; poly(oxyethylene) alkyl esters R—COO(CH$_2$CH$_2$O)$_n$H or R—COO(CH$_2$CH$_2$O)$_{n-1}$ —CH$_2$CH$_2$COO—R wherein R is alkyl group containing 6 to 24 carbon atoms and n = 3 to 120, such as poly(oxyethylene) glycol monocapronate, poly(oxyethylene) glycol mono-oleate, poly(oxyethylene)glycol monolaurate, poly(oxyethylene) glycol monostearate, poly(oxyethylene)glycol dilaurate and poly(oxyethylene)glycol distearate; poly(oxyethylene) alkylamines R—NH(CH$_2$CH$_2$O)$_n$H or

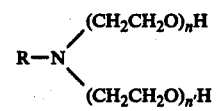

wherein R is alkyl group containing 6 to 30 carbon atoms and n and n' = 3–120, such as poly(oxyethylene) laurylamine, poly(oxyethylene) cetylamine and poly(oxyethylene) stearylamine; poly(oxyethylene) alkylamides R—CONH(CH$_2$CH$_2$O)$_n$H or

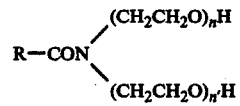

wherein R is alkyl group containing 6 to 30 carbon atoms and n and n' = 3–120, such as poly(oxyethylene) laurylamide and poly(oxyethylene) stearylamide; fatty acid esters of poly(oxyethylene)-sorbitane

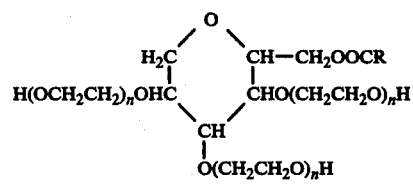

wherein R is alkyl group containing 6 to 24 carbon atoms and n = 3–60, such as poly(oxyethylene)sorbitane monolaurate, poly(oxyethylene)sorbitane monostearate and poly(oxyethylene)sorbitane mono-oleate; and poly(oxyethylene)-poly(oxypropylene) co-condensates of Pluronics type HO(CH$_2$CH$_2$O)$_a$(CH$_3$CHCH$_2$O)$_b$(CH$_2$—CH$_2$O)$_c$H wherein a, b and c > 1 and (a + b + c) = 20–400 and of Tetronics type

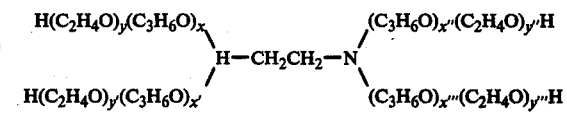

wherein x to x''' and y to y''' > 1 and x+x'+x''+x''' +y+y'+y''+y''' = 20–800, preferred are those containing a major proportion of oxyethylene units.

The test method for evaluating the activity of catalysts will be described.

In general, even if an internal combustion engine is operated at a stoichiometric air fuel (A/F) ratio the exhaust gas from the engine has the following range of gas composition which varies depending on the driving mode, load, etc:

| | |
|---|---|
| CO: 0.3 – 1.0%, | $H_2$: 0.1 – 0.3% |
| $O_2$: 0.2 – 0.5%, | NO: 0.05 – 0.15% |
| HC: 0.03 – 0.08% | $CO_2$: about 12% |
| $H_2O$: about 13% | $SO_2$: about 20 ppm (by volume) |

(See The Japan-U.S. Seminar on Catalytic $NO_x$ Reaction, R. Klimisch, November, 1975.)

In order to conduct the evaluation test for the catalysts according to the invention, we have prepared in our laboratory gas compositions similar to the actual exhaust gas compositions and conducted the test using different concentrations of oxygen gas corresponding to different A/F ratios. It should be noted at this point that the gas composition corresponding to an A/F ratio is determined by the Eltinge method (SAE 680114) and the stoichiometric A/F ratio is taken as 14.64 in this test.

The gas compositions (by volume) are shown in Table 1 below.

Table 1

| invariable components | | variable components | | |
|---|---|---|---|---|
| CO | 1.0% | $O_2$ 0.58% | A/F | 14.50 (R = 0.78) |
| $H_2$ | 0.32% | 0.72% | " | 14.60 (R = 0.95) |
| HC(propylene) | 330 ppm | 0.85% | " | 14.70 (R = 1.11) |
| NO | 1000 ppm | 0.99% | " | 14.80 (R = 1.30) |
| $H_2O$ | 10% | | | |
| $N_2$ | balance | | | |

In the above Table, the abbreviation "R" means a reductivity index, the values of R corresponding to the respective A/F ratios being defined as follows:

$$R = \frac{\text{total amount of components capable of emitting oxygen}}{\text{total consumption of components capable of consuming oxygen}}$$

$$= \frac{(\text{inlet oxygen \%}) + 0.5 \times (\text{NO \%})}{0.5 \times (\text{CO \%}) + 0.5 \times (H_2 \text{ \%}) + 4.5 \times (\text{HC \%})}$$

As will be seen from the above equation, when R = 1, the gas composition is in a stoichiometric state, with R > 1, the gas is oxidative, while with R < 1, the gas is reductive. When a gas composition added with 10% of $CO_2$ was tested to compare with that containing no $CO_2$ according to the above-mentioned evaluation method, it was found that there appeared no significant difference therebetween. Accordingly, no $CO_2$ was added to gas compositions in subsequent tests.

The activity test was conducted at a gas temperature of 400° C. at the inlet of catalyst bed and a space velocity of 50,000 $hr^{-1}$.

The net purification efficiency for NO was determined as follows. A catalyst bed outlet gas was fed together with predetermined secondary air to a platinum catalyst of 600° C. (i.e., 20 cc of 0.5 wt% Pt supported on an activated alumina carrier) to completely convert secondarily produced ammonia to NO by oxidation. The gas obtained after the conversion was analyzed to determine a total amount of unreacted NO and NO converted from secondarily produced ammonia, which was subtracted from an amount of the inlet NO. The net purification efficiency for NO is defined as a ratio of the thus subtracted amount to the amount of the inlet NO. The purification efficiency for CO and HC were each determined from analysis of the inlet and outlet gases.

The analyses were conducted by means of commercially available analyzers, i.e., the Chemilumi analyzer for NO, the NDIR analyzer for CO, the FID analyzer for HC and the Fuel Cell-type analyzer for $O_2$, respectively.

The present invention will be particularly illustrated by the following examples.

EXAMPLE 1

9.31 g of 85% phosphoric acid ($H_3PO_4$) and 2.85 g of barium nitrate ($Ba(NO_3)_2$) were dissolved in 55 cc of water, to which was further added 0.2 g of a Pluronics type nonionic surface active agent (i.e., a propylene oxide (PO)-ethylene oxide (EO) block copolymer having an average molecular weight of 11,000 and an EO content of 80% by weight of the total molecules). The solution was then added with 100 cc of a spherical activated alumina carrier (product of Rhone-Progil) of a surface area of 85 $m^2/g$ and an average particle size of 3 mm, well mixed for impregnation, and concentrated and evaporated to dryness on a water bath. The thus treated alumina carrier was dried at 150° C. for 2 hours and calcined in air at 700° C. for 3 hours.

Thereafter, 7.4 g of nickel nitrate ($Ni(NO_3)_2.6H_2O$) and 0.2 g of the same kind of the surface active agent as indicated above was dissolved in 55 cc of water, to which were added the P-Ba-on-alumina spheres. The solution was concentrated and evaporated to dryness in a manner similar to the above procedure to allow the nickel nitrate to be deposited on the spheres. The spheres were dried at 100° C. for 2 hours and calcined at 550° C. for 3 hours. The resulting P-Ba-Ni-on-alumina spheres were subsequently immersed in 55 cc of an aqueous solution of 0.0788 g of palladium nitrate ($Pd(NO_3)_2$), 0.0128 g of rhodium chloride ($RhCl_3.3H_2O$) and 0.2 g of the same kind of the surface active agent as used above. The solution was concentrated and evaporated to dryness to permit the deposition of the catalytic components on the spheres. The spheres were dried at 150° C. for 2 hours and reduced and calcined in a stream of 10% hydrogen containing nitrogen at 500° C. for 3 hours to obtain a final catalyst. The thus obtained catalyst had the following atomic weight ratios i.e., the deposition amounts of the respective components (expressed in terms of atom weight by gram per liter of carrier):

P:Ba:Ni:Pd:Rh = 25:15:15:0.5:0.05

EXAMPLE 2

Example 1 was repeated except that the P, Ba and Ni components were deposited on the carrier at the same time. The thus deposited carrier was subsequently deposited with the kinds of the Pd and Rh components as in Example 1, followed by reducing and calcining under the same conditions thereby obtaining a final catalyst of the same composition as in Example 1.

EXAMPLE 3

(a) The same amounts and kinds of the starting compounds and the surface active agent as used in Example 1 were used to deposit the P and Ba components and then the Ni component in the same procedure of Example 1 using calcining temperature of 900° C. and 550° C., respectively. The thus deposited carrier was then immersed in 55 cc of an aqueous solution containing 0.0128 g of rhodium chloride (RhCl$_3$.3H$_2$O) and 0.2 g of the same kind of the surface active agent as used in Example 1, followed by concentrating and evaporating to dryness. After being dried at 150° C. for 2 hours, the deposited carrier was further immersed in 55 cc of an aqueous solution of 0.0788 g of palladium nitrate and 0.2 g of the same kind of the surface active agent as used in Example 1, followed by concentrating and evaporating to dryness. Thereafter, the drying, reducing and procedure of Example 1 was repeated thereby obtaining a final catalyst.

(b) The above process was repeated except that, after the deposition of the nobel metal, the deposited carrier was calcined in air at 550° C. to obtain a catalyst.

EXAMPLES 4–7

Example 3 was repeated using different amounts of the P, Ba and Ni components. Four kinds of the deposited carriers were each treated in the same manner as in Example 1 to deposit the palladium and rhodium components thereon. The resulting catalysts had ratios of deposited elements as shown in Table 2 below.

Table 2

| | | |
|---|---|---|
| Example 4 | P : Ba : Ni : Pd : Rh = 5 | : 15 : 5 : 0.5 : 0.05 |
| Example 5 | P : Ba : Ni : Pd : Rh    2.5 | : 15 : 5 : 0.5 : 0.05 |
| Example 6 | P : Ba : Ni : Pd : Rh   15 | : 3 : 15 :0.5 : 0.05 |
| Example 7 | P : Ba : Ni : Pd : Rh = 5 | : 15 : 0 : 0.5 : 0.05 |

EXAMPLES 8–11

Example 3 was repeated to deposit predetermined amounts of the P, Ba and Ni components on four carrier samples. Then, Example 1 was repeated using for deposition different amounts of the Pd and Rh components with or without use of hexachloroplatinic acid (H$_2$PtCl$_6$.6H$_2$O) of special grade being dissolved in pure water.

The resulting catalysts had, respectively deposition compositions shown in Table 3 below.

Table 3

| | |
|---|---|
| Example 8 | P: Ba : Ni: Pd : Rh = 25 : 15 : 15 : 0.1 : 0.05 |
| Example 9 | P: Ba : Ni: Pd : Rh = 25 : 15 : 15 : 0.1 : 0.01 |
| Example 10 | P: Ba : Ni: Pd : Pt : Rh = 25: 15: 15: 0.35: 0.15: 0.05 |
| Example 11 | P : Ba : Ni : Pd : Pt : Rh = 25 : 15 : 15 : 0.15 : 0.35 : 0.05 |

EXAMPLE 12

7.45 g of 85% phosphoric acid (H$_3$PO$_4$) and 2.85 g of barium nitrate (Ba(NO$_3$)$_2$) were dissolved in 55 cc of water, to which was further added 0.2 g of a Pluronics-type nonionic surface active agent (i.e., a propylene oxide (PO)-ethylene oxide (EO) block copolymer having an average molecular weight of 11,000 and an EO content of 80% by weight of the copolymer). Then, the solution was added with 100 cc of a cylindrical activated alumina carrier (product of American Cyanamid Co.) of a surface area of 100 m$^2$/g, an average diameter of 3.2 mm and a length of 5–6 mm, well mixed to facilitate impregnation of the carrier with the solution, and concentrated and evaporated to dryness on a water bath. The thus dried carrier was further dried at 150° C. for 2 hours and calcined at 700° C. for 3 hours. Thereafter, 7.4 g of nickel nitrate (Ni(NO$_3$)$_2$.6H$_2$O) and 0.2 g of the same kind of the surface active agent as used above were dissolved in 55 cc of water, to which was added the P-Ba-deposited carrier, followed by concentrating and evaporating to dryness in the same manner as described above. The carrier was dried at 100° C. for 2 hours and calcined at 550° C. for 3 hours.

The P-Ba-Ni depositing carrier was then immersed in 55 cc of an aqueous solution of 0.133 g of hexachloroplatinic acid (H$_2$PtCl$_6$.6H$_2$O), 0.0128 g of rhodium chloride (RhCl$_3$.3H$_2$O) and 0.2 g of the same kind of the surface active agent as used above, followed by concentrating and evaporating to dryness to permit the metal components to be deposited on the carrier. The thus deposited carrier was dried at 150° C. for 2 hours and calcined under reducing conditions of a 10% hydrogen-containing nitrogen stream at 500° C. for 3 hours. The final catalyst had atomic weight ratios or deposition amounts (when expressed in terms of gram per liter of carrier) of the respective catalytic components shown below.

P:Ba:Ni:Pt:Rh = 20:15:15:0.5:0.05

EXAMPLE 13

This Example illustrates the simaltaneous deposition of P, Ba and Ni components. That is, Example 12 was repeated except that the P, Ba and Ni components were simaltaneously deposited by impregnation, calcined at 700° C. for 3 hours followed by depositing the Pt and Rh components on the carrier and calcining in a reductive atmosphere, thereby obtaining a final catalyst with the same composition as in Example 12.

EXAMPLE 14

The same kinds and amounts of the starting compounds and the surface active agent as used in Example 12 were used to deposit the P and Ba components on the carrier in the same manner as in Example 12. The thus deposited carrier was dried and calcined in a stream of air at 900° C. for 3 hours. The carrier was further deposited with the Ni component in a manner similar to Example 12 and calcined at 550° C. for 2 hours. Thereafter, 55 cc of an aqueous solution of 0.0128 g of rhodium chloride (RhCl$_3$.3H$_2$O) and 0.2 g of the same kind of the surface active agent as used in Example 12 was added to the carrier cylinders and concentrated and evaporated to dryness. The cylinders were dried at 150° C. for 2 hours and then immersed in 55 cc of an aqueous solution of 0.133 g of hexachloroplatinic acid (H$_2$PtCl$_6$.6H$_2$O) and 0.2 g of the same kind of the surface active agent as used above. After concentration and evaporation to dryness, the cylinders were dried and calcined in a reductive atmosphere in the same manner as in Example 12 to yield a catalyst.

EXAMPLE 15

Example 14 was repeated except that, after completion of the deposition of the final noble component, the cylinders were calcined in a stream of air at 550° C. without resorting to the reductive calcining technique.

EXAMPLE 16

Example 14 was repeated using 0.0823 g of dinitrodiammino platinum (Pt(NH$_3$)$_2$(NO$_2$)$_2$) instead of hexachloroplatinic acid, thereby yielding a catalyst.

EXAMPLE 17

Example 14 was repeated using 0.0140 g of rhodium nitrate (Rh(NO$_3$)$_3$) instead of rhodium chloride, thereby yielding a catalyst.

EXAMPLES 18-21

Example 14 was repeated to deposit different amounts of P, Ba and Ni components on carrier. Then, predetermined amounts of Pt and Rh components were applied onto the respective carriers, followed by calcining in a reductive atmosphere in the same manner as in Example 12 to obtain four kinds of catalysts. The thus obtained catalysts had element deposition ratios shown in Table 4 below.

Table 4

| Example 18 | P:Ba:Ni:Pt:Rh | = 15:20:5:0.5:0.05 |
|---|---|---|
| Example 19 | P:Ba:Ni:Pt:Rh | = 15:5:15:0.5:0.05 |
| Example 20 | P:Ba:Ni:Pt:Rh | = 2.5:15:5:0.5:0.05 |
| Example 21 | P:Ba:Ni:Pt:Rh | = 5:15:0:0.5:0.05 |

EXAMPLES 22-23

Example 14 was repeated to deposit predetermined amounts of P, Ba and Ni components on two carrier samples. Then, different amount of Pt and Rh components were further applied onto the respective deposited carriers, followed by calcining in a reductive atmosphere in the same manner as in Example 12 to obtain two kinds of catalysts. The thus obtained catalysts had element deposition ratios shown in Table 5 below.

Table 5

| Example 22 | P:Ba:Ni:Pt:Rh = 20:15:15:0.1:0.05 |
|---|---|
| Example 23 | P:Ba:Ni:Pt:Rh = 20:15:15:0.1:0.01 |

EXAMPLE 24

Example 1 was repeated without use of the surface active agent, thereby obtaining a catalyst.

EXAMPLE 25

Example 1 was repeated using, instead of the Plutonics type nonionic surface active agent, 0.4 g of a Tetronic type nonionic surface active agent (i.e., propylene oxide(PO)-ethylene(oxide(EO) block copolymer having an average molecular weight of 9,000 and an EO content of 70% by weight of the copolymer), thereby obtaining a catalyst of the same composition of Example 1.

EXAMPLE 26

Example 1 was repeated using, as surface active agent, 0.6 g of flaky polyethylene glycol with an average molecular weight of 6,000, thereby obtaining a catalyst of the same composition as in Example 1.

EXAMPLE 27

Example 12 was repeated without use of any surface active agent thereby obtaining a catalyst.

EXAMPLE 28

Example 12 was repeated using, instead of the Pluronics type nonionic surface active agent, 0.4 g of a Tetronic type noionic surface active agent (i.e., a PO-EO block copolymer having an average molecular weight of 9,000 and an EO content of 70% by weight of the copolymer), thereby obtaining a catalyst of the same composition as in Example 12.

EXAMPLE 29

Example 12 was repeated using, instead of the Pluronics type nonionic surface active agent, 0.6 g of flaky polyethylene glycol having an average molecular weight of 6,000, thereby obtaining a catalyst of the same composition as in Example 12.

EXAMPLE 30

To 1,200 g of alumina sol of alumina content of 15% by weight there was added 180 cc of a 62% nitric acid and after heating to effect solution of alumina sol, added thereto nitric acid little by little to adjust the pH of solution to 2.9. The solution was cooled to room temperature, then added thereto 780 g of a finely powdered rho-alumina having a weight accumulative average particle size (mediam diameter) of 11 microns and containing particle sizes of 50 microns or more in the amount of 5% by weight to prepare an alumina slurry of alumina content of 43% by weight. The slurry was stirred at 15° C. and when its viscosity reached 100 cp, a honeycomb structured cylindrical cordierite support of diameter of 3.66 inches and a length of 6 inches (approximately 1 liter volume), a weight of 520 g, a porosity of 31%, having 225 square-sectioned gas passageways per 25 mm square (25 mm × 25 mm), and of thickness of the wall of the passageway of about 0.23 mm was immersed therein for 2 minutes and blown off by air to remove excess alumina slurry retained in the passageways. The support was then allowed to stand still at 25° C. for 30 minutes and then at 40° C. for 2 hours, dried at 120° C. for 3 hours and calcined at 500° C. for 5 hours. The amount of alumina supported on the support was 105 g.

The support was put in a glass vessel of inner diameter of 95 mm and a height of 180 mm, then poured therein 1,000 cc of an aqueous solution containing 62 g of $H_3PO_4$ and 75 g of $Ba(NO_3)_2$ to impregnate the alumina coated substrate for 5 minutes. The solution retained by the support was blown off by air and the support was dried in air at 150° C. for 3 hours and calcined at 700° C. for 5 hours.

Then the support was put in the said glass vessel again, then poured therein 1,000 cc of an aqueous solution containing 9.9 g of hexachloroplatinic acid ($H_2PtCl_6.6H_2O$) and 0.95 g of rhodium chloride ($RhCl_3.3H_2O$) to impregnate the support for 5 minutes. After the similar air blowing and drying process to those used in the previous impregnation step, the support was calcined at 500° C. for 3 hours in a reductive atmosphere of hydrogen-containing gaseous nitrogen stream to obtain 636 g of a finished catalyst supporting 2.55 g of P, 5.1 g of Ba, 0.492 g of Pt and 0.048 g of Rh calculated as atom respectively.

CONTROL 1

A P-component-free, Pd-containing catalyst was prepared. That is, a general procedure of Example 1 was repeated to deposit the carrier first with the Ba and Ni components and then with the Pd and Rh components, followed by calcining in the reductive atmosphere.

CONTROL 2

A Ba-component-free, Pd-containing catalyst was prepared. The procedure of Example 1 was repeated to deposit the carrier first with the P and Ni components and then with the Pd and Rh components.

CONTROL 3

This Example illustrates preparation of a P- and Ba-components-free, Pd-containing catalyst. That is, the procedure of Example 1 was repeated to deposit the carrier first with the Ni component alone and then with the Pd and Rh components.

CONTROL 4

A Rh-component-free, Pd-containing catalyst was prepared. The procedure of Example 1 was repeated to deposit the carrier first with the P, Ba and Ni components and then with the Pd component alone.

CONTROL 5

A P-, Ba- and Ni-components-free, Pd-containing catalyst was prepared. That is, the procedure of Example 1 was repeated to deposit the Pd and Rh components on the carrier.

CONTROL 6

A Ni- and Rh-components-free, Pd-containing catalyst was prepared. That is, procedure of Example 1 was repeated to deposit the carrier first with the P and Ba components and then with the Pd component.

CONTROL 7

A P-component-free, Pt-containing catalyst was prepared by repeating a general procedure of Example 12 wherein the Ba and Ni components were first deposited on the carrier by impregnation and the Pt and Rh components were then deposited, followed by calcining in the reductive atmosphere.

CONTROL 8

A Ba-component-free, Pt-containing catalyst was prepared. That is, the procedure of Example 12 was repeated to deposit by impregnation the carrier first with the P and Ni components and then with the Pt and Rh components, followed by calcining in the reductive atmosphere.

CONTROL 9

A P- and Ba-components-free, Pt-containing catalyst. That is, the procedure of Example 12 was repeated to deposit the carrier first with the Ni component alone and then Pt and Rh components, followed by calcining in the reductive atmosphere.

CONTROL 10

A P-, Ba- and Ni-components-free, Pt containing catalyst was prepared. That is, the procedure of Example 12 was repeated to deposit by impregnation the carrier with the Pt and Rh components and calcining the thus deposited carrier in the reductive atmosphere.

CONTROL 11

A Ni- and Rh-components-free, Pt-containing catalyst was prepared. That is, the procedure of Example 12 was repeated to deposit the carrier first with the P and Ba components and then with the Pt component alone, followed by calcining in the reductive atmosphere.

CONTROL 12

A Rh-component-free, Pt-containing catalyst was prepared. That is, a procedure of Example 12 was repeated to deposit the carrier with the P, Ba and Ni components and then with the Pt component alone, followed by calcining in the reductive atmosphere.

The catalysts of Controls 1-12 had, respectively, the following metal or catalytic component deposition ratios shown in Table 6 below.

Table 6

| | | |
|---|---|---|
| Control 1 | P:Ba:Rb:Pd:Pt:Rh | = 0:15:10:0.5:0:0.05 |
| Control 2 | P:Ba:Ni:Pd:Pt:Rh | = 15:0:10:0.5:0:0.05 |
| Control 3 | P:Ba:Ni:Pd:Pt:Rh | = 0:0:20:0.5:0:0.05 |
| Control 4 | P:Ba:Ni:Pd:Pt:Rh | = 25:15:15:0.5:0:0 |
| Control 5 | P:Ba:Ni:Pd:Pt:Rh | = 0:0:0:0.5:0:0.05 |
| Control 6 | P:Ba:Ni:Pd:Pt:Rh | = 20:15:0:0.5:0:0 |
| Control 7 | P:Ba:Ni:Pd:Pt:Rh | = 0:15:10:0:0.5:0.05 |
| Control 8 | P:Ba:Ni:Pd:Pt:Rh | = 10:0:10:0:0.5:0.05 |
| Control 9 | P:Ba:Ni:Pd:Pt:Rh | = 0:0:10:0:0.5:0.05 |
| Control 10 | P:Ba:Ni:Pd:Pt:Rh | = 0:0:0:0:0.5:0.05 |
| Control 11 | P:Ba:Ni:Pd:Pt:Rh | = 10:15:0:0:0.5:0 |
| Control 12 | P:Ba:Ni:Pd:Pt:Rh | = 20:15:15:0:0.5:0 |

EXAMPLE 31

The catalysts prepared in Examples 1-29 and Controls 1-12 were each subjected to activity evaluation tests in accordance with the afore-described 3-way reaction test method, with the results of Table 7. The tolerable 3-way reaction window width was determined by use of the catalyst of Example 12. The results are shown in a sole FIGURE in which the percent conversions (purification efficiencies) of $NO_x$, CO and HC(propylene) are, respectively, plotted against the A/F ratios at 14.50, 14.60, 14.65, 14.70 and 14.80. The range of width of the A/F ratios within which the exhaust components are removable all at levels above 80% is determined from the FIGURE and expressed in terms of "A/F unit". As will be clear from the Table 7, the catalysts of the present invention are higher in percent conversions for the respective gas components and greater in window width than those of Controls.

It will be understood by comparing the results of the catalysts of Examples 3(a) and 14 with those of Examples 3(b) and 15 that the catalysts obtained by calcining even either in a reductive atmosphere or in an oxidative atmosphere have the practically same catalytic effects. Furthermore, it will be seen from the test results that the catalysts of Controls 1 and 7 which are free of P to be one of the essential components of the catalyst according to the invention are lower in NO net purification efficiency, the Ba-component-free catalysts of Controls 2 and 8 are poorer in an ability of oxidizing CO, and the Rh-component-free catalysts of Controls 4 and 6 are narrower in 3-way reaction window width. Though the chemical behavior, upon the 3-way reaction, of each of the essential components such as P, Ba and Rh is not clearly known at the present stage of our investigation, it is believed that the synergestic effect of these components is ascribable to the state of dispersion of rhodium and palladium and/or platinum as well as the parameters such as acidity or basicity of the entirety of the catalytic active substances. The catalysts using surface active agents as prepared in Examples 1, 25 and 26 are found to have an improved effect on purification rate for NO over the catalyst of Example 24 using no surface active agent.

Table 7

| Catalyst Example | Catalytic composition Atomic weight ratio g/l-catalyst | | | | | | NO net purification efficiency (%) A/F | | | | CO purification efficiency (%) A/F | | | | HC purification efficiency (%) A/F | | | | Window width for more than 80% of 3 components simultaneously (A/F unit) |
|---|---|---|---|---|---|---|---|---|---|---|---|---|---|---|---|---|---|---|---|
| | P : | Ba : | Ni | Pd : | Pt : | Rh | 14.50 | 14.60 | 14.70 | 14.80 | 14.50 | 14.60 | 14.70 | 14.80 | 14.50 | 14.60 | 14.70 | 14.80 | |
| 1 | 25 | 15 | 15 | 0.5 | — | 0.05 | 76 | 95 | 65 | | 69 | 92 | 99 | | 97 | 99 | 100 | | 0.12 |
| 2 | 25 | 15 | 15 | 0.5 | — | 0.05 | 73 | 94 | 64 | | 68 | 92 | 99 | | 97 | 98 | 99 | | 0.12 |
| 3(a) | 25 | 15 | 15 | 0.5 | — | 0.05 | 77 | 95 | 66 | | 70 | 93 | 99 | | 97 | 99 | 100 | | 0.13 |
| 3(b) | 25 | 15 | 15 | 0.5 | — | 0.05 | 73 | 94 | 65 | | 68 | 91 | 99 | | 97 | 98 | 99 | | 0.12 |
| 4 | 5 | 15 | 5 | 0.5 | — | 0.05 | 72 | 94 | 59 | | 73 | 95 | 100 | | 99 | 100 | 100 | | 0.13 |
| 5 | 2.5 | 15 | 5 | 0.5 | — | 0.05 | 68 | 93 | 58 | | 74 | 95 | 100 | | 99 | 100 | 100 | | 0.11 |
| 6 | 15 | 3 | 15 | 0.5 | — | 0.05 | 80 | 97 | 66 | | 63 | 89 | 98 | | 97 | 98 | 100 | | 0.11 |
| 7 | 5 | 15 | — | 0.5 | — | 0.05 | 71 | 96 | 64 | | 72 | 95 | 99 | | 98 | 98 | 100 | | 0.14 |
| 8 | 25 | 15 | 15 | 0.1 | — | 0.05 | 67 | 93 | 61 | | 69 | 94 | 98 | | 96 | 98 | 99 | | 0.12 |
| 9 | 25 | 15 | 15 | 0.1 | — | 0.01 | 63 | 91 | 60 | | 70 | 93 | 97 | | 96 | 97 | 98 | | 0.10 |
| 10 | 25 | 15 | 15 | 0.35 | 0.15 | 0.05 | 65 | 89 | 68 | | 76 | 97 | 100 | | 93 | 95 | 96 | | 0.10 |
| 11 | 20 | 15 | 15 | 0.15 | 0.35 | 0.05 | 75 | 94 | 76 | 47 | 68 | 89 | 98 | 99 | 92 | 98 | 98 | 97 | 0.13 |
| 12 | 20 | 15 | 15 | — | 0.5 | 0.05 | 82 | 96 | 92 | 71 | 67 | 90 | 98 | 99 | 89 | 97 | 98 | 97 | 0.20 |
| 13 | 20 | 15 | 15 | — | 0.5 | 0.05 | 81 | 95 | 92 | 70 | 65 | 88 | 97 | 98 | 87 | 96 | 97 | 96 | 0.19 |
| 14 | 20 | 15 | 15 | — | 0.5 | 0.05 | 83 | 96 | 94 | 72 | 67 | 89 | 98 | 98 | 88 | 97 | 98 | 96 | 0.21 |
| 15 | 20 | 15 | 15 | — | 0.5 | 0.05 | 82 | 95 | 93 | 74 | 68 | 90 | 99 | 99 | 88 | 96 | 97 | 97 | 0.21 |
| 16 | 20 | 15 | 15 | — | 0.5 | 0.05 | 76 | 94 | 88 | 71 | 67 | 91 | 99 | 99 | 95 | 98 | 99 | 99 | 0.19 |
| 17 | 20 | 15 | 15 | — | 0.5 | 0.05 | 83 | 96 | 92 | 73 | 66 | 89 | 98 | 99 | 88 | 97 | 97 | 96 | 0.20 |
| 18 | 15 | 20 | 5 | — | 0.5 | 0.05 | 81 | 95 | 92 | 72 | 69 | 90 | 98 | 99 | 89 | 97 | 98 | 97 | 0.21 |
| 19 | 15 | 5 | 15 | — | 0.5 | 0.05 | 85 | 96 | 94 | 76 | 60 | 87 | 98 | 98 | 86 | 93 | 95 | 96 | 0.20 |
| 20 | 2.5 | 15 | 5 | — | 0.5 | 0.05 | 78 | 94 | 91 | 63 | 72 | 91 | 99 | 99 | 92 | 97 | 98 | 98 | 0.19 |
| 21 | 5 | 15 | 0 | — | 0.5 | 0.05 | 81 | 97 | 88 | 61 | 69 | 91 | 99 | 99 | 93 | 98 | 98 | 97 | 0.18 |
| 22 | 20 | 15 | 15 | — | 0.1 | 0.05 | 80 | 95 | 92 | 68 | 65 | 87 | 99 | 98 | 85 | 95 | 96 | 95 | 0.18 |
| 23 | 20 | 15 | 15 | — | 0.1 | 0.01 | 77 | 93 | 89 | 67 | 63 | 86 | 96 | 97 | 82 | 93 | 95 | 95 | 0.17 |
| 24 | 25 | 15 | 15 | 0.5 | — | 0.05 | 74 | 93 | 63 | | 67 | 92 | 99 | | 97 | 98 | 99 | | 0.12 |
| 25 | 25 | 15 | 15 | 0.5 | — | 0.05 | 77 | 95 | 64 | | 69 | 93 | 99 | | 97 | 99 | 100 | | 0.12 |
| 26 | 25 | 15 | 15 | 0.5 | — | 0.05 | 76 | 95 | 64 | | 68 | 93 | 99 | | 97 | 99 | 100 | | 0.12 |
| 27 | 20 | 15 | 15 | — | 0.5 | 0.05 | 81 | 95 | 92 | 70 | 66 | 89 | 97 | 98 | 87 | 97 | 98 | 97 | 0.19 |
| 28 | 20 | 15 | 15 | — | 0.5 | 0.05 | 84 | 96 | 93 | 73 | 67 | 90 | 98 | 97 | 88 | 97 | 98 | 97 | 0.21 |
| 29 | 20 | 15 | 15 | — | 0.5 | 0.05 | 83 | 96 | 92 | 72 | 66 | 89 | 98 | 98 | 87 | 96 | 98 | 96 | 0.20 |
| Control | | | | | | | | | | | | | | | | | | | |
| 1 | — | 15 | 10 | 0.5 | — | 0.05 | 51 | 77 | 53 | | 75 | 95 | 100 | | 98 | 99 | 100 | | none |
| 2 | 15 | — | 10 | 0.5 | — | 0.05 | 77 | 95 | 65 | | 61 | 84 | 97 | | 96 | 97 | 99 | | 0.08 |
| 3 | — | — | 20 | 0.5 | — | 0.05 | 61 | 93 | 44 | | 68 | 92 | 99 | | 97 | 98 | 99 | | 0.09 |
| 4 | 25 | 15 | 15 | 0.5 | — | — | 47 | 87 | 45 | | 64 | 92 | 99 | | 97 | 98 | 99 | | 1.07 |
| 5 | — | — | — | 0.5 | — | 0.05 | 58 | 93 | 40 | | 69 | 92 | 99 | | 97 | 99 | 100 | | 0.08 |
| 6 | 20 | 15 | — | 0.5 | — | — | 45 | 86 | 41 | | 62 | 90 | 98 | | 97 | 99 | 100 | | 0.07 |
| 7 | — | 15 | 10 | — | 0.5 | 0.05 | 57 | 86 | 84 | 62 | 78 | 93 | 99 | 100 | 96 | 98 | 99 | 99 | 0.13 |
| 8 | 10 | — | 10 | — | 0.5 | 0.05 | 88 | 97 | 96 | 77 | 54 | 85 | 98 | 98 | 77 | 91 | 96 | 95 | 0.20 |
| 9 | — | — | 10 | — | 0.5 | 0.05 | 67 | 92 | 87 | 66 | 70 | 88 | 98 | 99 | 90 | 95 | 97 | 97 | 0.17 |
| 10 | — | — | — | — | 0.5 | 0.05 | 69 | 93 | 85 | 60 | 72 | 91 | 99 | 99 | 93 | 97 | 98 | 98 | 0.17 |
| 11 | 10 | 15 | — | — | 0.5 | | 58 | 83 | 80 | 49 | 57 | 86 | 98 | 99 | 51 | 88 | 98 | 99 | 0.11 |
| 12 | 20 | 15 | 15 | — | 0.5 | | 52 | 81 | 83 | 54 | 48 | 85 | 98 | 98 | 42 | 87 | 98 | 0.11 | |

EXAMPLE 32

The catalysts obtained in Examples 3, 7, 8, 9, 14, 21, 22 and 23 and controls 4, 6, 11 and 12 were each subjected to a test for determining temperature characteristics by use of the reaction device of Example 31. The gas to be treated had substantially the same composition as used in Example 31, with the oxygen content being 0.78% (which corresponds to R = 1.0 and A/F = 14.64 when expressed as chemically stoichiometric amount). In addition, the gas temperature at the inlet of the catalyst bed was changed from 300° C. to 600° C. The test results are shown in Table 8 below.

It will be seen from the Table that the Ni-component-free catalyst of Example 7 and 21 had only a slightly increased net purification efficiency for NO in the high temperature range. While, the catalysts of Controls 4, 11 and 12 are found to be poor in the net purification efficiency for NO in the low temperature range.

Table 8

| Catalyst EXAMPLE | NO net purification efficiency (%) Temperature (° C) | | | | CO purification efficiency (%) Temperature (° C) | | | | HC purification efficiency (%) Temperature (° C) | | | |
|---|---|---|---|---|---|---|---|---|---|---|---|---|
| | 300 | 400 | 500 | 600 | 300 | 400 | 500 | 600 | 300 | 400 | 500 | 600 |
| 3-a | 83 | 97 | 99 | 98 | 93 | 98 | 99 | 100 | 97 | 99 | 99 | 99 |
| 7 | 84 | 96 | 97 | 96 | 94 | 98 | 100 | 100 | 96 | 99 | 100 | 100 |
| 8 | 81 | 95 | 98 | 98 | 91 | 97 | 99 | 99 | 96 | 98 | 99 | 100 |
| 9 | 79 | 93 | 97 | 97 | 91 | 97 | 98 | 99 | 96 | 98 | 99 | 99 |
| 14 | 88 | 97 | 98 | 99 | 92 | 97 | 99 | 100 | 93 | 98 | 99 | 99 |
| 21 | 90 | 96 | 96 | 95 | 95 | 98 | 99 | 100 | 96 | 99 | 100 | 100 |
| 22 | 85 | 95 | 98 | 98 | 91 | 96 | 98 | 99 | 95 | 98 | 99 | 100 |
| 23 | 82 | 93 | 97 | 98 | 90 | 95 | 97 | 99 | 95 | 98 | 99 | 99 |
| CONTROL | | | | | | | | | | | | |
| 4 | 72 | 89 | 94 | 97 | 93 | 98 | 98 | 99 | 98 | 100 | 100 | 100 |
| 6 | 80 | 88 | 93 | 94 | 89 | 94 | 96 | 96 | 96 | 99 | 100 | 100 |
| 11 | 73 | 87 | 89 | 92 | 90 | 97 | 99 | 100 | 95 | 97 | 99 | 100 |
| 12 | 66 | 85 | 91 | 96 | 88 | 96 | 98 | 98 | 94 | 97 | 99 | 99 |

EXAMPLE 33

(Thermal Stability Test)

The catalysts tested in Example 32 were each thermally treated in a stream of air in an electric furnace of 700° C. for 24 hours. Each of the thus treated catalysts was subjected to a test to determine the temperature characteristics in the same manner as in Example 32. As a result, it was found that though the NO net purification efficiencies at 300° C. were lowered by about 2% as compared with those of the respective catalysts shown in Table 8, the purification efficiencies for CO and HC hardly varied.

EXAMPLE 34

The Catalysts obtained in Examples 3a, 7, 8, 9, 11, 14, 21, 22, 23, 24 and 30 and Controls 1, 2, 3, 4, 5, 7, 8, 10 and 11 were each contacted with an actual exhaust gas by use of a test device installed on a stationary internal combustion engine to determine the durability and resistance to poisoning effect. The respective catalysts were placed in a stainless steel reactor capable of packing five catalysts therein at a time. The five catalysts were packed to have the same resistance to air permiation, through which there was passed a whole amount of the exhaust from a commercially available four-cylindered engine (Nissan L-18) of a displacement of 1800 cc equipped with a dynamometer. The dynamometer was invariably loaded correspondingly to the load of the standard running mode. The A/F ratio in the carbureter was suitably controlled by replacing a fixed orifice in the main fuel passage of the carbureter by a needle-type variable orifice. The employed fuel was found by chemical elementary analysis to have a C to H ratio of 1.90, thus the theoretical equivalent A/F ratio being 14.65. The A/F ratio was determined throughout the course of the test by analyzing oxygen, carbon dioxide, carbon monoxide, hydrocarbons and nitrogen oxides contained in the exhaust from the engine according to the Eltinge method.

When the reactor was maintained at an inlet gas temperature of 550° C. and the engine was operated at constant revolutions of 2,300 r.p.m., the gas passed through the respective catalysts had a space velocity of about 70,000 hr$^{-1}$, under which conditions the performance of the respective catalysts was measured. The analysis of the effluent gas was made by means of a non-dispersive infrared gas analyzer (NDIR) for CO, $CO_2$ and NO, a flame ionization detector gas analyzer (FID) for hydrocarbons (HC), and a fuel cell-type oxygen analyzer for $O_2$.

The amount of $NH_3$ was determined by absorbing it in an aqueous boric acid solution and titrating the resulting solution with sulfuric acid with use of a Methyl Red-Methylene Blue indicator.

The performance of the fresh catalysts packed in the reactor was first determined. Then, a 200 hours stationary running durability test was conducted by increasing revolutions of the engine and the catalyst bed inlet temperature up to 670° C. while maintaining the space velocity at about 100,000 hr$^{-1}$ and the A/F ratio in the range of 14.5 to 14.65.

The HEW rated low lead gasoline employed for comparing poison-resistant characteristics of catalysts was added with small amounts of Pd, P and S to enhance the poisoning effect.

The catalyst which had been subjected to the durability test were each again subjected to the performance test using the exhaust from the engine similarly to the procedure for the fresh catalysts, with the test results shown in Table 9.

The test results reveal that the catalysts of Controls 3, 5 and 10 containing neither P nor Ba are much inferior in purification efficiency for NO or for CO and HC and inferior in durability and resistance to poisoning effect to the catalyst of the present invention. It is also found that the catalysts of Controls 1 and 7 containing no phosphorus (P) is poorer in purification efficiency for NO and that the catalysts of Controls 2 and 8 containing no barium (Ba) is poorer in oxidative power for CO.

The catalyst of Example 1 using no surface active agent upon the preparation thereof is found to be slightly inferior in purification rate for NO to the catalyst of Example 3(a) using a surface active agent.

Table 9

| Catalyst Ex. | NO net purification efficiency (%) | | CO purification efficiency (%) | | HC purification efficiency (%) | |
|---|---|---|---|---|---|---|
| | fresh | after 200 hrs | fresh | after 200 hrs | fresh | after 200 hrs |
| 3a | 95 | 88 | 83 | 82 | 93 | 90 |
| 7 | 94 | 86 | 83 | 81 | 94 | 92 |
| 8 | 95 | 85 | 82 | 80 | 93 | 90 |
| 9 | 92 | 84 | 82 | 81 | 93 | 89 |
| 11 | 93 | 86 | 83 | 81 | 93 | 91 |
| 14 | 97 | 92 | 85 | 83 | 93 | 89 |
| 21 | 95 | 89 | 88 | 86 | 95 | 91 |
| 22 | 94 | 90 | 87 | 81 | 92 | 88 |
| 23 | 92 | 86 | 85 | 81 | 92 | 87 |
| 24 | 95 | 91 | 85 | 82 | 93 | 90 |
| 30 | 93 | 85 | 84 | 81 | 92 | 85 |
| CONTROL | | | | | | |
| 1 | 82 | 69 | 89 | 85 | 94 | 91 |
| 2 | 96 | 92 | 74 | 68 | 92 | 87 |
| 3 | 94 | 65 | 84 | 72 | 93 | 80 |
| 4 | 88 | 78 | 82 | 80 | 93 | 89 |
| 5 | 93 | 60 | 85 | 74 | 93 | 81 |
| 7 | 84 | 73 | 88 | 86 | 95 | 92 |
| 8 | 97 | 93 | 75 | 73 | 91 | 85 |
| 10 | 94 | 71 | 86 | 81 | 93 | 87 |
| 11 | 78 | 73 | 85 | 83 | 93 | 90 |

EXAMPLE 35

The catalysts which had been subjected to the poisoning-resistant test in Example 34 were again tested to determine a 3-way reaction window width range within which the three categories of air pollutant components of $NO_x$, CO and HC are each removable in a percentage above 80%.

The test results are shown in Table 10, revealing that the catalyst of the present invention have a great 3-way reaction window width, while the catalysts of Controls 1 and 7 using no phosphorus (P) and of Controls 3 and 10 using no barium have a NO net removal percentage below 80%, so that the window width is not present or very narrow even if present. Further, the catalysts of Controls 2 and 8 have an effective window width but are both low in oxidative power for CO, lacking a 3-way reaction balance.

Table 10

| Catalyst EX. | NO net purification efficiency (%) A/F | | | | CO purification efficiency (%) A/F | | | | HC purification efficiency (%) A/F | | | | Window width for more than 80% of 3 components simultaneously (A/F unit) |
|---|---|---|---|---|---|---|---|---|---|---|---|---|---|
| | 14.50 | 14.60 | 14.70 | 14,80 | 14.50 | 14.60 | 14.70 | 14.80 | 14.50 | 14.60 | 14.70 | 14.80 | |
| 3a | 68 | 89 | 62 | | 65 | 90 | 98 | | 95 | 96 | 99 | | 0.10 |
| 7 | 64 | 87 | 60 | | 66 | 91 | 98 | | 95 | 97 | 99 | | 0.09 |
| 8 | 60 | 85 | 60 | | 64 | 90 | 97 | | 93 | 95 | 98 | | 0.08 |
| 9 | 58 | 84 | 58 | | 65 | 89 | 97 | | 93 | 96 | 98 | | 0.07 |
| 14 | 74 | 93 | 90 | 63 | 62 | 87 | 97 | 98 | 82 | 94 | 98 | 97 | 0.17 |
| 21 | 76 | 94 | 84 | 56 | 64 | 88 | 98 | 98 | 85 | 95 | 98 | 97 | 0.15 |
| 22 | 73 | 92 | 88 | 62 | 60 | 85 | 96 | 98 | 79 | 93 | 97 | 97 | 0.15 |
| 23 | 70 | 90 | 85 | 58 | 58 | 84 | 93 | 97 | 76 | 91 | 96 | 97 | 0.14 |
| 24 | 73 | 93 | 89 | 63 | 63 | 87 | 97 | 98 | 83 | 94 | 98 | 97 | 0.17 |
| CONTROL | | | | | | | | | | | | | |
| 1 | 44 | 69 | 51 | | 69 | 93 | 99 | | 95 | 97 | 99 | | none |
| 2 | 71 | 90 | 63 | | 50 | 82 | 94 | | 93 | 95 | 98 | | 0.06 |
| 3 | 42 | 70 | 43 | | 57 | 80 | 92 | | 88 | 90 | 95 | | none |
| 4 | 61 | 78 | 53 | | 63 | 90 | 97 | | 93 | 96 | 98 | | 0.01 |
| 7 | 48 | 77 | 76 | 51 | 74 | 89 | 98 | 99 | 86 | 93 | 98 | 98 | none |
| 8 | 79 | 94 | 91 | 68 | 51 | 80 | 96 | 97 | 71 | 87 | 95 | 95 | 0.15 |
| 11 | 51 | 79 | 76 | 45 | 54 | 85 | 96 | 98 | 44 | 85 | 95 | 97 | none |

What is claimed is:

1. A catalyst for purifying exhaust and waste gases which is capable of simultaneously removing nitrogen oxides, carbon monoxide and hydrocarbons from the exhaust gases at high efficiencies consisting essentially of 2 to 50 g of phosphorus, 2 to 50 g of barium, 0 to 30 g of nickel, as oxide 0.05 to 3 g of at least one member selected from the group consisting of palladium and platinum and 0.005 to 0.3 g of rhodium in elemental form, calculated as atom, supported on an inert carrier per liter of a final catalyst.

2. A catalyst according to claim 1, wherein said inert carrier is in the form of granules.

3. A catalyst according to claim 1, wherein said inert carrier is in a monolithic form.

4. A catalyst according to claim 1, wherein said inert carrier is primarily composed of alumina.

5. A catalyst according to claim 1, wherein said inert carrier is supported, as calculated as atom per liter of a final catalyst, with 2 to 30 g of phosphorus, 2 to 30 g of barium, 0 to 20 g of nickel, 0.1 to 2 g of said at least one member, and 0.01 to 0.2 g of rhodium.

6. A method for the preparation of a catalyst for purifying exhaust and waste gases which is capable of simultaneously removing nitrogen oxides, carbon monoxide and hydrocarbons from the exhaust gases at high efficiencies comprising impregnating an inert carrier with aqueous solutions of catalytic components of 2 to 50 g of phosphorus, 2 to 50 g of barium and 0 to 30 g of nickel in ionic form when calculated as atom per liter of a final catalyst, calcining the thus impregnated carrier at a temperature of 400° to 1050° C., subjecting said impregnated carrier to further impregnation with catalytic components of 0.05 to 3 g of at least one member selected from the group consisting of palladium and platinum and 0.005 to 0.3 g of rhodium in ionic form onto the calcined carrier, drying the thus impregnated carrier, and subjecting the dried carrier to activation by heating in an oxidative atmosphere or heating in a reductive atmosphere or treating with a reducing agent in liquid phase.

7. A method according to claim 6, wherein the activation is conducted at a temperature of 150° to 600° C. in an oxidative atmosphere.

8. A method according to claim 6, wherein the activation is conducted at a temperature of 150° to 600° C. in a reductive atmosphere.

9. A method according to claim 6, wherein the activation is conducted at a temperature of 10° to 50° C. in a liquid phase of hydrazine or formaldehyde.

10. A method according to claim 6 wherein the impregnation of the carrier by the catalytic components composed of phosphorus and barium in ionic form is conducted by immersing said carrier in an aqueous solution of said components, drying the thus immersed carrier, and calcining the dried carrier.

11. A method according to claim 6 wherein the impregnation of the carrier by the catalytic components composed of phosphorus and barium is conducted by immersing said carrier in an aqueous solution of one of said catalytic components, drying and then calcining the thus impregnated carrier, and treating the calcined carrier with the other component in the same manner.

12. A method according to claim 6, wherein the impregnation of the carrier by the catalytic components composed of phosphorus, barium and nickel is conducted by immersing said carrier in an aqueous solution of all of said catalytic components, and drying and then calcining the thus impregnated carrier.

13. A method according to claim 6, wherein the impregnation of the carrier by the catalytic components composed of phosphorus, barium and nickel is conducted by immersing said carrier in an aqueous solution of the phosphorus and barium components, drying and then calcining the thus impregnated carrier, and treating the calcined carrier with an aqueous solution of the nickel component in the same manner.

14. A method according to claim 6, wherein the impregnation of the carrier by the catalytic components composed of phosphorus, barium and nickel is conducted by providing an aqueous solution containing each of the respective components, and repeating a sequential procedure of impregnation, drying and calcining for each of the respective aqueous solutions, utilizing said solutions in any desired order.

15. A method according to claim 6, wherein the impregnation of the carrier by the catalytic components is effected in the presence of a poly-(oxyethylene)type nonionic surface active agent having an average molecular weight of above 500.

16. A method according to claim 6, wherein said inert carrier is impregnated with 2 to 30 g of phosphorus, 2 to 30 g of barium, 0 to 20 g of nickel, 0.1 to 2 g of said at least one member selected from the group consisting of palladium, platinum and rhodium, and 0.01 to 0.2 g of rhodium when calculated as atom per liter of a final catalyst.

* * * * *